United States Patent [19]

Simons et al.

[11] 4,011,400
[45] Mar. 8, 1977

[54] APPARATUS FOR READING AN OPTICALLY READABLE REFLECTING INFORMATION STRUCTURE

[75] Inventors: Carel Arthur Jan Simons; Hendrik' T. Lam, both of Eindhoven, Netherlands

[73] Assignee: U.S. Philips Corporation, New York, N.Y.

[22] Filed: Sept. 4, 1975

[21] Appl. No.: 610,329

[30] Foreign Application Priority Data

July 7, 1975 Netherlands ............... 7508052

[52] U.S. Cl. ................. 358/127; 179/100.3 V; 358/128
[51] Int. Cl.² ................................ G11B 7/00
[58] Field of Search ........... 179/100.3 V, 100.3 D; 178/6.6 DD, 6.6 R

[56] References Cited

UNITED STATES PATENTS

| | | | |
|---|---|---|---|
| 3,876,842 | 4/1975 | Bouwhuis | 179/100.3 D |
| 3,913,076 | 10/1975 | Lehurenu | 179/100.3 V |
| 3,932,701 | 1/1976 | Adler | 178/6.6 R |

*Primary Examiner*—Thomas B. Habecker
*Attorney, Agent, or Firm*—Frank R. Trifari; Simon L. Cohen

[57] ABSTRACT

An apparatus is described for reading a radiation-reflecting record carrier on which information is stored in an optically readable track-shaped phase structure. The apparatus inter alia includes a radiation source, an objective system and a radiation-sensitive detection system. By a suitable arrangement and a suitable choice of the power of a cylindrical lens, which lens in conjunction with a four-quadrant detector supplies a focussing signal, it is possible to detect centering-errors with the aid of only two additional detectors in the plane of the four-quadrant detector.

1 Claim, 7 Drawing Figures

APPARATUS FOR READING AN OPTICALLY READABLE REFLECTING INFORMATION STRUCTURE

The invention relates to an apparatus for reading a radiation-reflecting record carrier which is provided with information in an optically readable track-shaped information structure, which apparatus includes a radiation source and an objective system for passing radiation from the radiation source to a radiation-sensitive detection system via the record carrier.

Such an apparatus is inter alia known, from "Philips' Technical Review" 33, No. 7, pages 186–189. The known apparatus is employed for reading a record carrier on which a color television program is stored. The information structure is a phase structure and consists of a multitude of areas alternating with intermediate areas, which are arranged in a spiral track, which areas and intermediate areas are situated at different levels in the record carrier. The information is contained in the lengths of the areas and those of the intermediate areas. For a sufficiently long playing time the details of the information structure will be very small in the case of limited dimensions of the record carrier. For example, if a 30-minutes television program is stored at one side of a disk-shaped round record carrier in an annular area with an outer radius of approx. 15 cm and an inner radius of approx. 8 cm, the width of the tracks will be approx. 0.8 $\mu$m and the average length of the areas and of the intermediate area will be approx. 1 $\mu$m.

In order to enable these small details to be read an objective system with a very large numerical aperture is to be used. However, the depth of focus of such an objective system is small, so that the objective system should always remain sharply focussed on the plane of the information structure. As in the read apparatus the distance between the plane of the information structure and the objective system may vary, provisions have to be made to enable said variations to be detected and the focussing to be corrected with the aid thereof.

Furthermore, the read spot which is formed on the plane of the information structure by the objective system should always remain centered on a track portion to be read, as otherwise a reduction of the modulation depth of the read-out signal and cross-talk between adjacent track portions may occur. Centering of the read spot relative to a track portion to be read means that the center of the read spot should coincide with the center of the track portion. In the case of an off-center read spot the centers will not coincide. Therefore, the read apparatus should also include means for detecting the magnitude and the direction of a centering error of the read spot relative to a track portion to be read, so that the position of the read spot can be corrected.

As is described in the cited article, centering errors may be detected with the aid of two additional radiation spots and two additional radiation-sensitive detectors conjugative therewith by means of the objective system. Furthermore, it has been proposed previously to detect focussing errors with the aid of an additional (focussing) beam, which traverses the objective system skew and which after reflection at the record carrier is incident on two additional detectors.

It is an object of the present invention to provide a read apparatus in which without the use of auxiliary beams and with a minimum number of elements both focussing error and centering errors can be detected. The apparatus according to the invention is characterized in that the detection system comprises a composite detector consisting of four sub-detectors and, two further detectors which, viewed in a direction transverse to the effective track direction, are disposed at different sides of the composite detector, and that the detection system is disposed near an image of the exit pupil of the objective system, which image is formed by a cylindrical lens whose cylinder axis is parallel to the effective track direction.

The invention is based on the recognition that by a suitable arrangement and a suitable choice of the power of the cylindrical lens, which is first of all used to enable focussing errors to be detected by means of the composite detector, it can be achieved that the exit pupil of the objective system is imaged in the plane of the composite detector by the cylindrical lens. As a result, the detectors for detecting centering errors in a manner to be described hereinafter, can also be arranged in said plane.

"Effective track direction" is to be understood to mean the direction of the image of a track portion to be read on the surface of the detection system or on the cylindrical lens respectively.

The invention will now be described with reference to the drawing, in which

FIGS. 3 and 5 show a detection system for use in said apparatus, while

Figure 1:
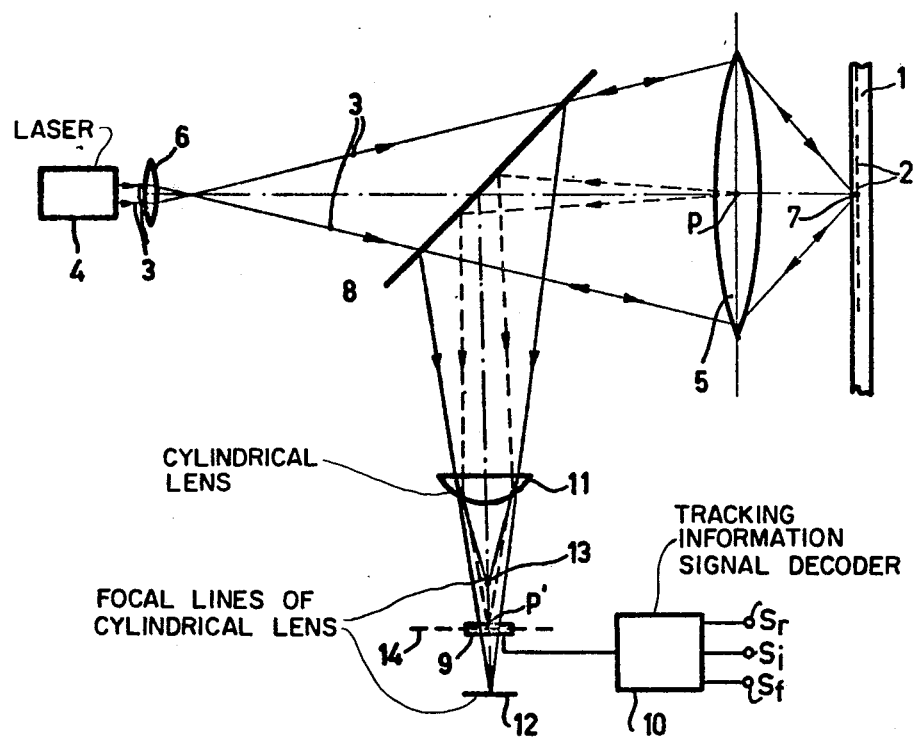
FIG. 1 shows a read apparatus according to the invention.

FIG. 1 represents an apparatus with a round disk-shaped record carrier 1 in cross-section. The information structure is a phase structure and comprises a multitude of concentric or quasi-concentric tracks 2, which tracks consist of successive areas and intermediate areas (not shown). The areas may for example be disposed at a different level in the record carrier than the intermediate areas. The information may for example be a color television program, but also other information such as a multitude of different images or digital information.

The record carrier is illuminated with a read beam 3, which is obtained from a laser source 4, for example a c.w. laser. An objective system, which for simplicity is represented by a single lens 5, focusses the read beam at the plane of the tracks 2. The auxiliary lens 6 has been included to ensure that the pupil of the objective system is filled, so that the read spot 7 has minimum dimensions. The read beam is reflected by the record carrier and thereby modulated in accordance with the information stored in a track portion to be read. For separating the onward (unmodulated) and the reflected (modulated) read beam the radiation path includes a beam separator 8, for example in the form of a semi-transparent mirror. The beam separator directs the modulated read beam towards a radiation-sensitive detection system 9. Said detection system is connected to an electronic circuit 10 in which a high-frequency information signal $S_i$ and, as is to be explained hereinafter, a low-frequency focussing signal $S_f$ and also a low-frequency centering signal $S_r$ are derived.

In order to enable focussing errors to be detected the radiation path behind the beam separator 8 includes a cylindrical lens 11. The optical system which consists of the objective system 5 and the cylindrical lens 11 then has an astigmatic effect. An astigmatic system has not one focal point but two focal lines which, viewed axially, occupy different positions and which are perpendicular to each other. Thus, the objective system and the cylindrical lens add two focal lines 12 and 13 to the read spot 7. In FIG. 1 the line 13 is perpendicular to the plane of the drawing. The radiation-sensitive detection system is now arranged in a plane 14 between the lines 12 and 13, preferably there where the total area of the image of the read spot 7 is minimal. The shape of said image is determined by the degree of focussing of the read beam on the plane of the information structure.

Figures 2A, 2B, 2C:
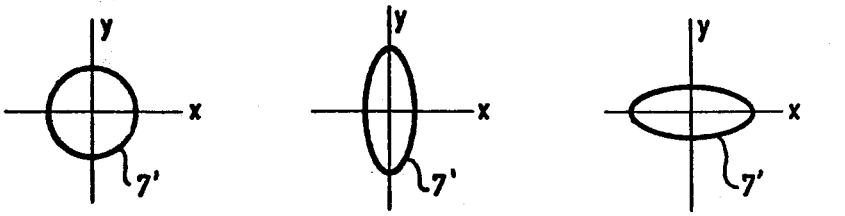
FIGS. 2a, 2b, 2c and 4 illustrate the principles of the focussing-error and centering-error detection.

FIG. 2a shows the shape of the image (7') of the radiation spot 7, in the case that the objective system and the plane of the tracks are at the correct distance. In this Figure and in FIGS. 2b and 2c, the X-direction corresponds to the effective track direction and the Y-direction to the direction of the normal to the plane of drawing in FIG. 1. If the distance between the plane of the tracks and the objective system is too great, the lines 12 and 13 will be situated nearer to the lens 11. The line 12 is moved towards the plane 14 and the line 13 is moved away from the plane 14, so that the image 7' will have the shape of FIG. 2b. If the distance between the objective system and the plane of the tracks is too small, the lines 12 and 13 will be further away from the lens 11, and in that case the shape of the image 7' will be as in FIG. 2c.

Figure 3:
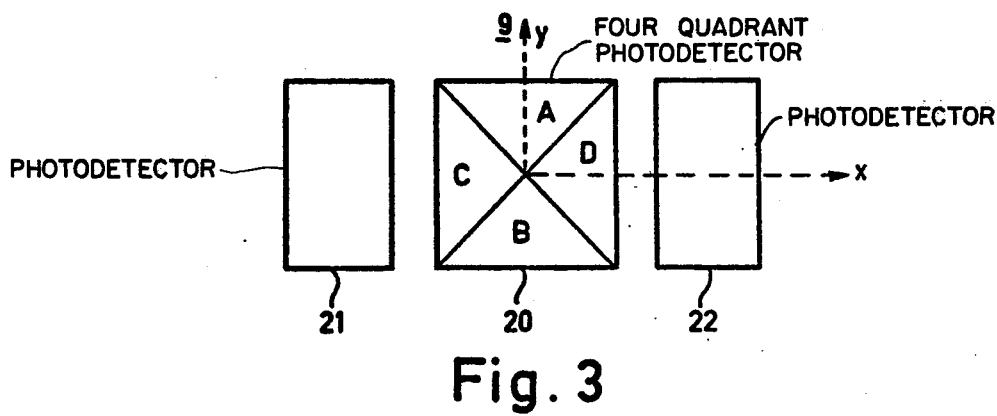

In order to enable the shape of the image 7' and thus the degree of focussing to be determined, the detection system comprises a composite detector 20 as shown in FIG. 3. Said detector is a so-called quadrant-cell, which for example consists of four photodiodes A, B, C and D whose bounding lines make a 45° angle with the effective track direction. When the signals supplied by these photodiodes are $S_A$, $S_B$, $S_C$ and $S_D$ respectively, the focussing signal will be $S_f = (S_A + S_B) - (S_C + S_D)$. It is evident that if the objetive system and the plane of the tracks are at the correct mutual distance (the situation of FIG. 2a), the signal $(S_A + S_B)$ will equal the signal $(S_C + S_D)$, that for the situation of FIG. 2b the signal $(S_A + S_B)$ will be greater than the signal $(S_C + S_B)$ and that for the situation of FIG. 2c the signal $(S_A + S_B)$ will be smaller than the signal $(S_C + S_D)$. From the low-frequency signals of the photo-diodes A, B, C and D a control signal may be derived electronically, in a manner known per se, by means of which signal the focussing can be corrected, for example by moving the objective system.

As the focussing variations have a low frequency relative to the frequency with which the information details pass through the beam cross-section, the composite detector may also be employed for reading the information on the record carrier. The information signal $S_i$ is than given by $S_i = S_A + S_B + S_C + S_D$. The signal $S_i$ is for example a maximum or a minimum when the read spot is projected on an intermediate area or on an area respectively.

Figure 4:
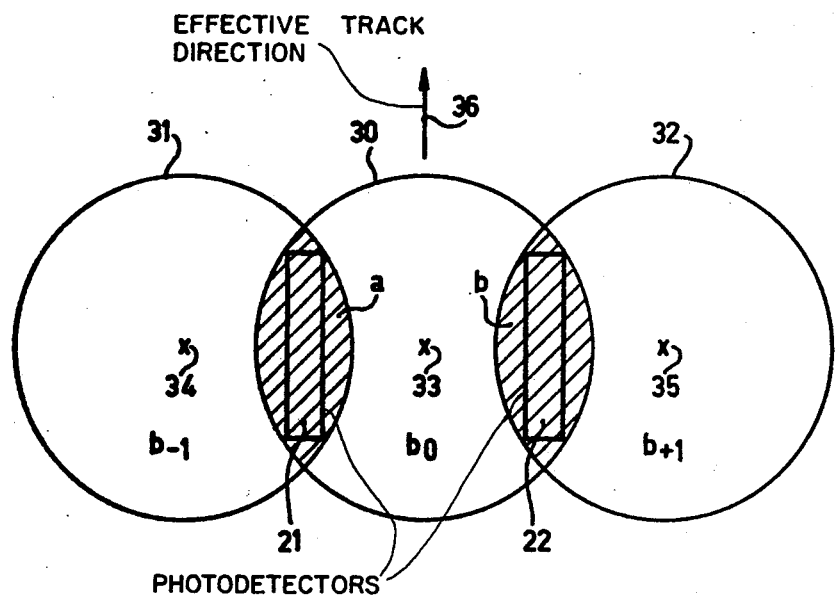

In order to enable detection of the centering of the read spot 7 relative to a track portion to be read, use can be made of the diffraction of the read beam at the tracks of the information structure. The adjacent track portions of the information structure namely constitute a diffraction grating which when illuminated with a radiation spot with dimensions greater than the width of the tracks, separates the incident radiation into a zero-order beam ($b_o$), two first order beams ($b_{+1}$ and $b_{-1}$) and a number of higher-order beams. If the numerical aperture of the objective system would be sufficiently large, all orders together would yield an accurate image of the diffraction grating in the image plane of the objective system. In said image plane the individual orders cannot be distinguished. In the plane of the exit pupil of the objective system, however, the orders are more or less separated. The circle 30 in FIG. 4 represents the exit pupil, and thus the cross-section of the beam $b_o$. The circles 31 and 32 are the cross-sections of the beam $b_{-1}$ and $b_{+1}$ at the location of the exit pupil. The arrow 36 indicates the effective track direction. The distances between the center 33 of the circle 30 and the centers 34 and 35 of the circles 31 and 32 are determined by the wavelength $\lambda$ of the radiation used and the period $p$ of the track structure. The angle $\alpha$, not shown, between the chief rays of the first-order beams $b_{-1}$ and $b_{+1}$ and the chief ray of the zero-order beam is given by $\sin \alpha = \lambda/p$. By a suitable choice of the wavelength $\lambda$, the period $p$ and the numerical aperture of the objective system, it can be achieved that only the part of the first-order beams shown shaded in FIG. 4 is transmitted by the objective system. In the area of overlap ($a$ and $b$ in FIG. 4) of the beam $b_{-1}$ and the beam $b_o$, and of the beam $b_{+1}$ and the beam $b_o$, respectively, interference occurs.

As the information structure is a phase structure and for example consists of pits pressed into the record carrier surface, there will be a constant phase difference between the zero order beam and the first-order beam if the read spot is correctly centered on a track portion to be read. Said phase difference is determined by the depth of the pits and the geometry of the pit structure. When the read spot now moves transversely to the track direction the phase relation between the beam $b_o$ and the beams $b_{-1}$ and $b_{+1}$ will change and thus also the radiation intensities in shaded areas $a$ and $b$ of FIG. 4. From the diffraction theory for phase gratings it is known that the intensity variation in the area $a$ is then in anti-phase with the intensity variation in the area $b$. When the read spot is moved from a specific position in a direction transverse to the track direction for example the intensity in the area $a$ will decrease and the intensity in the area $b$ will increase. In the case of movement of the read spot in an opposite direction the intensity in the area $a$ will increase and that in the area $b$ will decrease. By arranging two detectors 21 and 22 (see FIG. 4) in the areas $a$ and $b$, and comparing the output signals of the detectors, a centering error can be detected, so that the position of the read spot can be corrected in a maner known per se.

For the method of centering-error detection described is essential that the detectors are disposed in the exit pupil of the objective system or in another plane in which the various orders are satisfactorily separated, the so-called "far field". However, for the previously described method of detecting focussing errors the composite detector, should be disposed in a plane in which a sharp or substantially sharp image of the read spot is formed.

Figure 5:
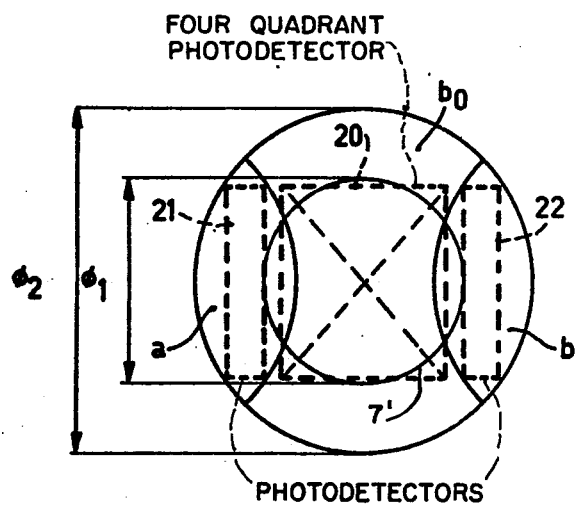

However, according to the invention the two detection methods may be combined in one read apparatus. For this purpose the cylindrical lens 11 is oriented so that its cylinder axis is parallel to the effective track direction. Thus, in FIG. 1 said axis is perpendicular to the plane of drawing. The cylindrical lens is disposed in such an axial position and the power is selected so that said lens images the exit pupil of the objective system in the plane 14 in which the composite detector is disposed. In FIG. 1, by way of example is shown by dash-lines how the image $p'$ of a central point $p$ of exit pupil is formed. It is to be noted that it is only important that the areas of overlap $a$ and $b$ are imaged in the plane 14. The cylindrical lens should have a lens action for the direction transverse to the effective track direction (the direction 36 in FIG. 4), which is why the axis of the cylindrical lens must be parallel to the effective track direction. As the areas of overlap $a$ and $b$ are imaged in the plane 14 by the cylindrical lens, the two detectors 21 and 22 for centering-error detection may also be arranged in said plane. Said detectors are disposed at either side of the composite detector 20, compare FIG. 5. In said Figure the locations of the cross-sections of the beams $b_o$, $b_{-1}$ and $b_{+1}$ in the plane 14 are shown relative to the detectors.

The present invention has the advantage that by a suitable choice of the parameters of one element, namely the cylindrical lens, which is required to enable focussing-error detection, it is also possible to detect centering errors, only two additional detectors being required. As the centering-error detectors are disposed in the same plane as the composite detector, said detectors may form one integrated detector, so that in respect of the detectors no alignment problems will occur during assembly of the read apparatus.

The location and the power of the cylindrical lens depend on the other parameters of the optical read apparatus and can therefore not be further specified in general. To give an idea of the mutual relations of the parameters some values are given relating to a realized embodiment of an apparatus according to the invention. The distance between the exit pupil of the objective system and the line 12 was 160 mm, the distance between the cylindrical lens and the line 12 was 40 mm, while the distance between the lines 12 and 13 was 29.1 mm, and the distance between the plane 14 and the line 12 was 22.9 mm. The objective system had a numerical aperture of 0.45 mm and a magnification of 20. The focal length of the cylindrical lens was 15 mm. The cross-section of the exit pupil was 7.5 mm. The cross-section of the pupil images ($\phi_2$ in FIG. 5) was 0.68 mm and that of the image of the radiation spot ($\phi_1$ in FIG. 5) 0.51 mm.

The fact that the invention has been described with reference to a round disk-shaped record carrier provided with television program by no means implies that it is limited thereto. The invention may be employed for reading any optical record carrier with a reflecting track-shaped phase structure and an arbitrary information contents.

What is claimed is:

1. An apparatus for reading a radiation-reflecting record carrier which is provided with information in an optical readable track-shaped information structure, which apparatus is of the type including a radiation source and an objective system for passing radiation from the radiation source to a radiation-sensitive detection system via the record carrier, the improvement wherein the detection system comprises a composite detector consisting of four-sub-detectors, and two further detectors which, viewed in a direction transverse to the effective track direction, are disposed at different sides of the composite detector, and that the detection system is disposed near an image of the exit pupil of the objective system, and a cylindrical lens whose cylinder axis is parallel to the effective track direction for forming said image of said exit pupil.

* * * * *